US008179562B2

(12) United States Patent
Sheng

(10) Patent No.: US 8,179,562 B2
(45) Date of Patent: May 15, 2012

(54) IMAGE-CAPTURING DEVICE HAVING COVER WITH INCLINED PLANE

(75) Inventor: Thomas Sheng, Hsinchu (TW)

(73) Assignee: Avision Inc. (TW)

(*) Notice: Subject to any disclaimer, the term of this patent is extended or adjusted under 35 U.S.C. 154(b) by 537 days.

(21) Appl. No.: 12/420,119

(22) Filed: Apr. 8, 2009

(65) Prior Publication Data

US 2009/0257178 A1 Oct. 15, 2009

(30) Foreign Application Priority Data

Apr. 9, 2008 (TW) .............................. 97206002 U

(51) Int. Cl.
*H04N 1/04* (2006.01)
*G03G 15/00* (2006.01)

(52) U.S. Cl. ......... 358/1.6; 358/474; 358/496; 358/497; 358/498; 399/362; 399/377; 399/380

(58) Field of Classification Search ........................ None
See application file for complete search history.

(56) References Cited

U.S. PATENT DOCUMENTS

| | | | | |
|---|---|---|---|---|
| 5,053,819 | A * | 10/1991 | Malyon et al. | 399/362 |
| 7,194,219 | B2 * | 3/2007 | Sato et al. | 399/81 |
| 2005/0190413 | A1 * | 9/2005 | Khovaylo | 358/474 |

* cited by examiner

*Primary Examiner* — Benny Q Tieu
*Assistant Examiner* — Haris Sabah

(57) ABSTRACT

An image-capturing device including a body, an optical module and an upper cover is provided. The body has an upper surface and a first inclined plane, wherein the upper surface has an image-capturing area, and the first inclined plane is connected and located adjacent to the upper surface. The optical module is movably disposed in the body and is for capturing an image of a document inside the image-capturing area. The upper cover has a lower surface and a second inclined plane, wherein the second inclined plane is connected and located adjacent to the lower surface. When the upper cover is closed upon the body, the second inclined plane is placed atop the first inclined plane. The included angle between the second inclined plane and the lower surface is at least equal to the included angle between the first inclined plane and the upper surface and less than 180 degrees.

11 Claims, 2 Drawing Sheets

IMAGE-CAPTURING DEVICE HAVING COVER WITH INCLINED PLANE

This application claims the benefit of Taiwan application Serial No. 97206002, filed Apr. 9, 2008, the subject matter of which is incorporated herein by reference.

BACKGROUND OF THE INVENTION

1. Field of the Invention

The invention relates in general to an image-capturing device, and more particularly to an image-capturing device applicable to the image capturing of a book-type document.

2. Description of the Related Art

Along with the prosperity in business, the demand for documents increases and a large amount of documents are circulated within or between businesses. As a result, the usage of image-capturing devices, such as copiers, scanners or multi-function peripherals also increases.

When a book-type document, such as a book or a magazine, is scanned by an image-capturing device, normally the entire document is directly placed inside an image-capturing area of the image-capturing device and is covered by an upper cover, so that image capturing is performed.

However, a book-type document normally has a larger volume. When image capturing is performed on a book-type document, the entire document is normally placed on a scan platform, and thus the binding part of the book-type document will be within the image-capturing area and will be scanned as a shadow that greatly degrades the image quality. Moreover, when the book-type document is covered and pressed by the upper cover of the image-capturing device, the book-type document is flatly spread out and the binding part of the book-type document may even be damaged. Thus, how to improve the scanning quality of a book-type document and to protect the book-type document during image capturing has become a focus to the manufacturers.

SUMMARY OF THE INVENTION

The invention is directed to an image-capturing device. According to the invention, a book-type document can tightly contact the image-capturing area of the image-capturing device, so that the quality of the image of the book-type document is improved, and the book-type document will not be damaged during the process of image capturing.

According to an aspect of the present invention, an image-capturing device including a body, an optical module and an upper cover is provided. The body has an upper surface and a first inclined plane, wherein the upper surface has an image-capturing area, and the first inclined plane is connected and located adjacent to the upper surface. The optical module is movably disposed in the body and is for capturing an image of a document inside the image-capturing area. The upper cover has a lower surface and a second inclined plane, wherein the second inclined plane is connected and located adjacent to the lower surface. The second inclined plane is placed atop the first inclined plane when the upper cover is closed upon the body. The included angle between the second inclined plane and the lower surface is at least equal to the included angle between the first inclined plane and the upper surface and is less than 180 degrees.

The invention will become apparent from the following detailed description of the preferred but non-limiting embodiment. The following description is made with reference to the accompanying drawings.

DETAILED DESCRIPTION OF THE INVENTION

The invention provides an image-capturing device including a body, an optical module and an upper cover. The body has an upper surface and a first inclined plane. The upper surface has an image-capturing area. The first inclined plane is connected and located adjacent to the upper surface. The optical module is movably disposed in the body and is for capturing an image of a document inside the image-capturing area. The upper cover has a lower surface and a second inclined plane, wherein the second inclined plane is connected and located adjacent to the lower surface. The second inclined plane is placed atop the first inclined plane when the upper cover is closed upon the body. The included angle between the second inclined plane and the lower surface is at least equal to the included angle between the first inclined plane and the upper surface and is less than 180 degrees. When image capturing is performed on the document, a part of the document is placed inside the image-capturing area of the image-capturing device and other parts can be placed on the first inclined plane. When the upper cover is closed upon the body, the second inclined plane will press the parts of the document placed on the first inclined plane and thus stabilize the parts on the first inclined plane to improve the image quality. A preferred embodiment is disclosed below to elaborate the invention. However, the embodiment is only one of the implementations under the spirit of the invention, and is not for limiting the scope of protection of the invention.

Figure 1:
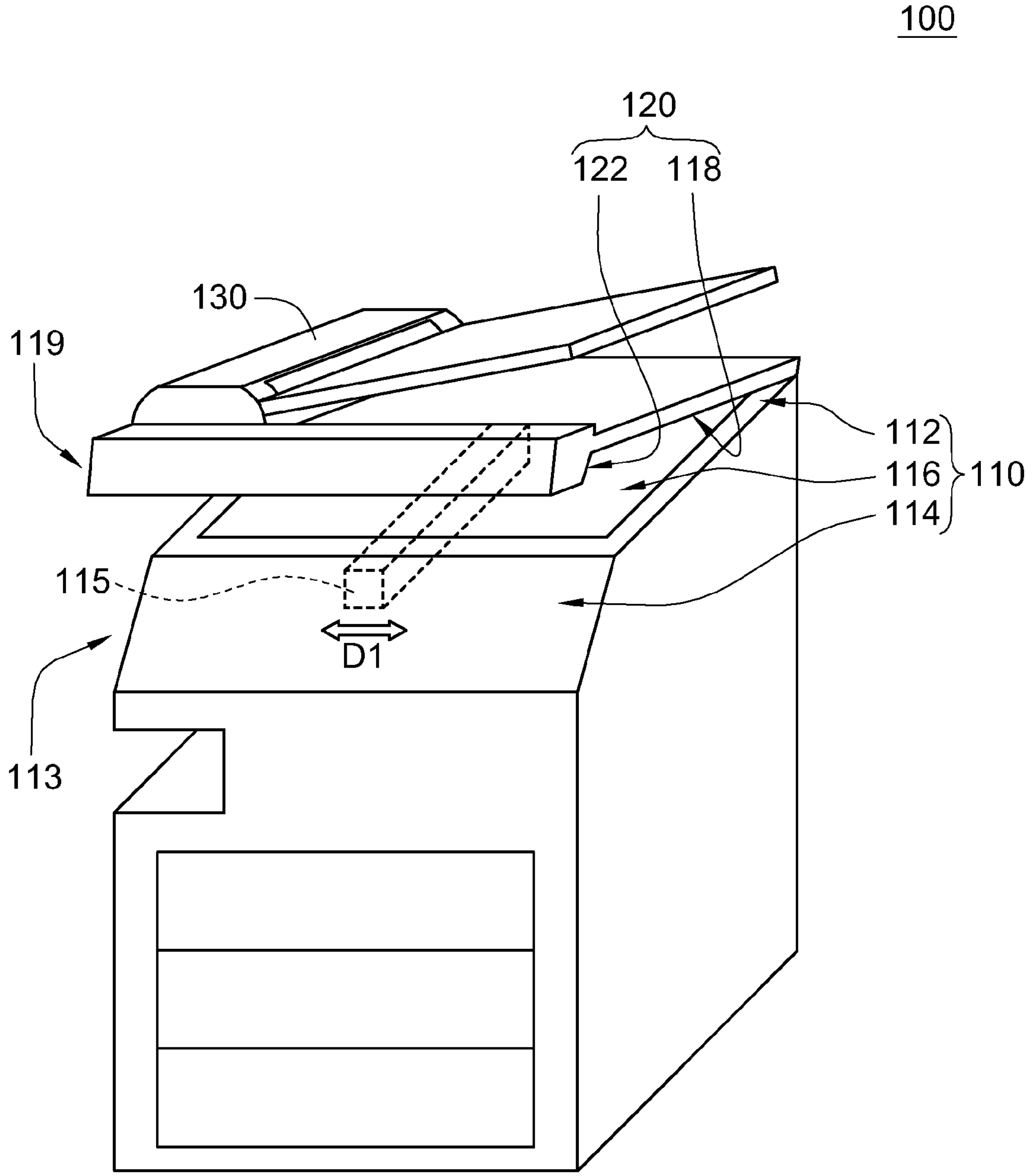
FIG. 1 shows an image-capturing device according to a preferred embodiment of the invention.
Figure 2:
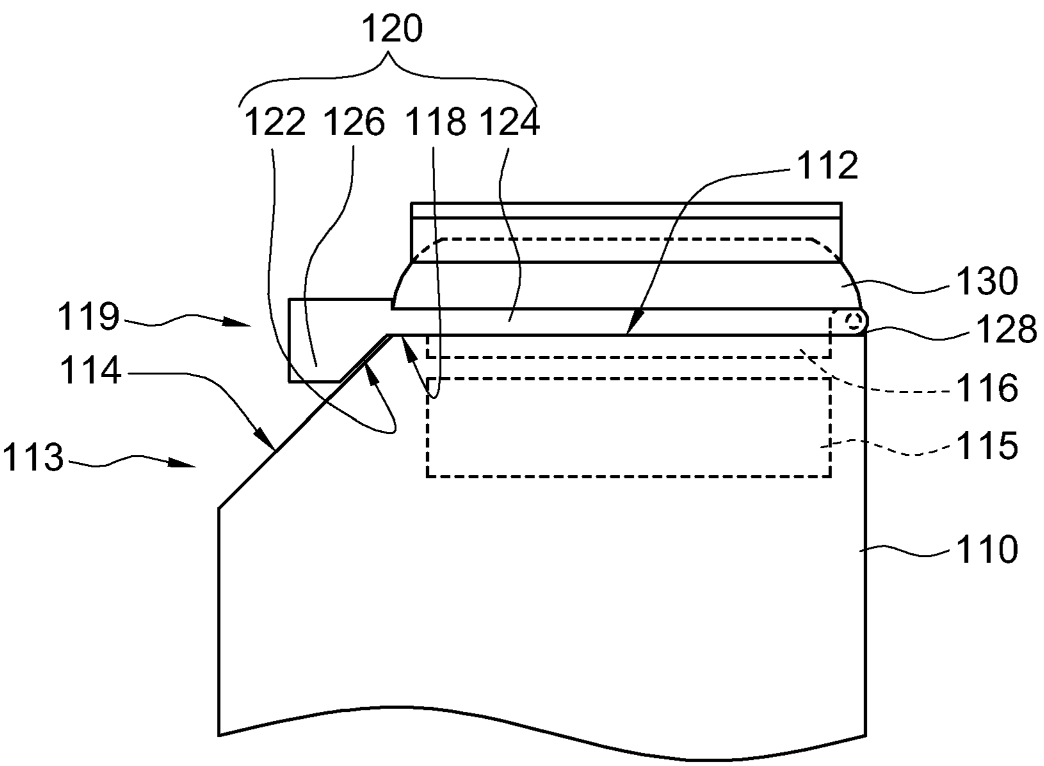
FIG. 2 shows a side view of the image-capturing device of FIG. 1.

Referring to FIG. 1, an image-capturing device according to a preferred embodiment of the invention is shown. The image-capturing device 100, such as a copier, a scanner or a multi-function peripheral, includes a body 110, an optical module 115 and an upper cover 120. The body 110 has an upper surface 112 and a first inclined plane 114. The upper surface 112 has an image-capturing area 116. The first inclined plane 114 is connected and located adjacent to the upper surface 112; that is, the first inclined plane 114 is located on the side 113 shown in FIG. 1. The optical module 115 is movably disposed in the body 110 and is for capturing an image of a document 117 (illustrated in FIG. 3) inside the image-capturing area 116, and the movement of the optical module 115 is in a direction D1. The upper cover 120 has a lower surface 118 and a second inclined plane 122, wherein the second inclined plane 122 is connected and located adjacent to the lower surface 118; that is, the second inclined plane 122 is located on the side 119 shown in FIG. 1. The second inclined plane 122 is placed atop the first inclined plane 114 when the upper cover 120 is closed upon the body 110. The included angle between the second inclined plane 122 and the lower surface 118 is at least equal to the included angle between the first inclined plane 114 and the upper surface 112 and is less than 180 degrees. That is, the included angle between the second inclined plane 122 and the lower surface 118 is greater than or equal to the included angle between the first inclined plane 114 and the upper surface 112. In the present embodiment of the invention, the included angle between the second inclined plane 122 and the lower surface 118 is equal to the included angle between the first inclined plane 114 and the upper surface 112. Referring to FIG. 2, a side view of the image-capturing device of FIG. 1 is shown. When the upper cover 120 is closed upon the body 110, the second inclined plane 122 is placed atop and is parallel to the first inclined plane 114.

As indicated in FIG. 2, the image-capturing device 100 includes a hinge 128 for connecting the body 110 and the upper cover 120, so that the upper cover 120 is rotatably connected to the body 110. In the present embodiment of the invention, the first inclined plane 114 and the hinge 128 are disposed in a manner that the first inclined plane 114 is located on a side of the body 110 parallel to the direction D1, and the hinge 128 is located on an opposite side. Let FIG. 1 be taken as an example. The first inclined plane 114 is located on the front side of the body 110, and the hinge 128 is located on the rear side of the body 110.

The first inclined plane and the second inclined plane are located on the front side of the body 110 in the present embodiment of the invention. In other embodiments, however, the first inclined plane and the second inclined plane can be located on any one side of the body 110. Likewise, the hinge can also be located on any one side of the body, and preferably is located on a different side from the second inclined plane.

Preferably, the upper cover 120 includes an upper cover board 124 and a block 126. The block 126 is disposed below the upper cover board 124. The second inclined plane 122 is a surface of the block 126. When the upper cover 120 is closed upon the body 110, the block 126 is placed atop the first inclined plane 114. In addition to providing a space for disposing the second inclined plane 122, the block 126 carries an own weight for pressing the document 117. When the upper cover 120 is closed upon the body 110, the own weight of the block 126 presses the parts of the document 117 placed between the first inclined plane 114 and the second inclined plane 122 onto the first inclined plane 114, so that the document 117 is stabilized and thus the quality of image capturing is improved.

The image-capturing device 100 further includes an automatic document feeder (ADF) 130 disposed on the upper cover board 124. If the document 117 is a non-binding document, such as a single sheet of paper, the document 117 can be placed on the ADF 130, and when the image capturing is activated, the document will be automatically conveyed to the image-capturing area and image capturing is performed on the document.

Figure 3:
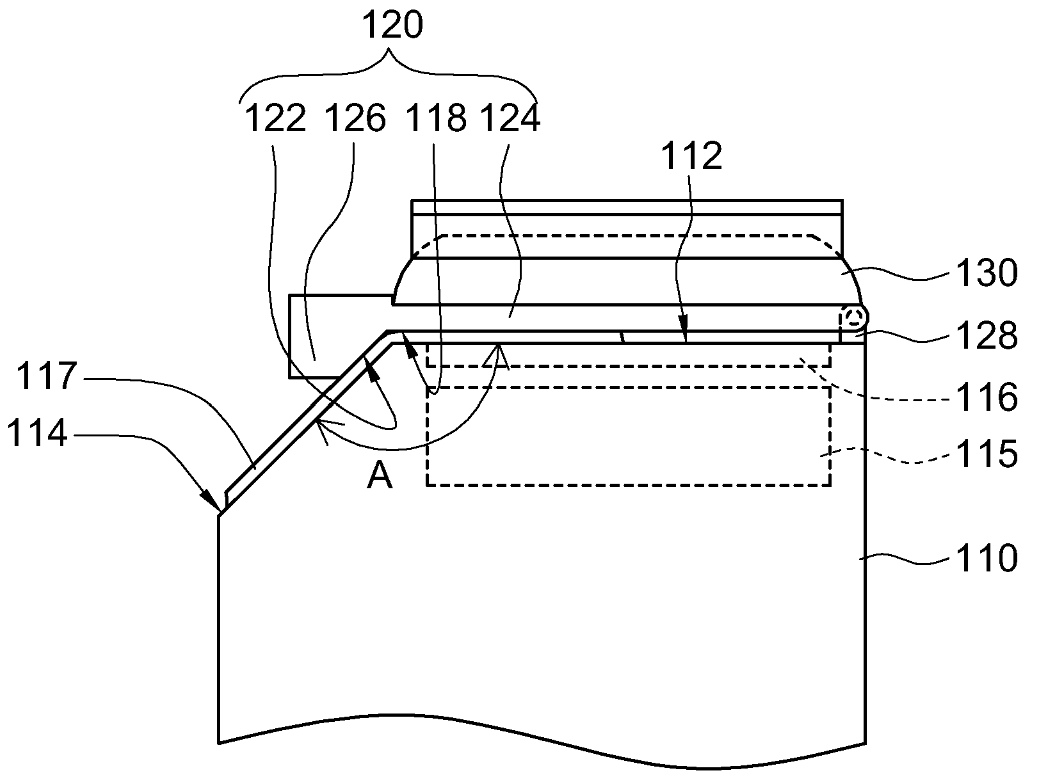
FIG. 3 shows the image-capturing device of the embodiment of the invention performing image capturing on a book-type document.

Referring to FIG. 3, the image-capturing device of the present embodiment performing image capturing on a document is shown. The included angle A between the first inclined plane 114 and the upper surface 112 is an obtuse angle. When capturing the image of a document 117 such as a book-type document, a part of the book-type document, such as the right-hand-side pages of the book-type document, can be flatly placed inside the image-capturing area 116. The binding part and other parts of the book-type document, such as the left-hand-side pages of the book-type document, are placed on and sustained by the first inclined plane 114.

As indicated in FIG. 3, the included angle between the second inclined plane 122 and the lower surface 118 is equal to the included angle between the first inclined plane 114 and the upper surface 112. As a result, when the upper cover 120 is closed upon the body 110, the second inclined plane 122 presses other parts of the document 117, that is, the parts of the document 117 placed on the first inclined plane 114, so that the document 117 is firmly in contact with the first inclined plane 114 and the upper surface 112. By tightly pressing the document 117 between the first inclined plane 114 and the second inclined plane 122, the document 117 is less likely to drop from the device due to gravity. Also, the part of the document 117 that is to be scanned is tightly in contact with the image-capturing area, so that the quality of image capturing is improved. In addition, the included angle A between the first inclined plane 114 and the upper surface 112 is an obtuse angle, and thus when the upper cover 120 covers a book-type document 117, the left-hand-side pages and the right-hand-side pages of the book-type document 117 do not need to be 180 degrees apart from each other, so that the binding part of the book-type document 117 will not be damaged.

Although the present embodiment is elaborated with a book-type document, a single-paper document is also applicable to the image capturing device. Placing a single-paper document inside the image-capturing area, the image of the single-paper document can be captured once the image capturing is activated.

According to the image-capturing device disclosed in the above embodiment of the invention, a book-type document can be placed on the body and be closely in contact with the image-capturing area. Thus, the quality of image capturing is improved. Moreover, the book-type document will not be damaged or drop from the image-capturing device, and the user will be more willing to use the image-capturing device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image-capturing device, comprising:

a body, having an upper surface and a first inclined plane, wherein the upper surface has an image-capturing area, and the first inclined plane is connected and located adjacent to the upper surface;

an optical module, movably disposed in the body, for capturing an image of a document inside the image-capturing area; and an upper cover, having a lower surface, an upper cover board, a block and a second inclined plane, wherein the block is disposed below the upper cover board, the second inclined plane which is a surface of the block is connected and located adjacent to the lower surface;

wherein the included angle between the second inclined plane and the lower surface is less than 180 degrees.

2. The image-capturing device according to claim 1, wherein the second inclined plane is placed atop the first inclined plane when the upper cover is closed upon the body.

3. The image-capturing device according to claim 1, wherein the included angle between the second inclined plane and the lower surface is equal to the included angle between the first inclined plane and the upper surface.

4. The image-capturing device according to claim 1, wherein the included angle between the second inclined plane and the lower surface is greater than the included angle between the first inclined plane and the upper surface.

5. The image-capturing device according to claim 1, wherein the included angle between the second inclined plane and the lower surface is an obtuse angle.

6. The image-capturing device according to claim 1, wherein the image-capturing device is a copier.

7. The image-capturing device according to claim 6, wherein the copier is a digital copier.

8. The image-capturing device according to claim 1, wherein the image-capturing device is a scanner.

9. The image-capturing device according to claim 1, wherein the image-capturing device is a multi-function peripheral.

10. The image-capturing device according to claim 1, further comprising an automatic document feeder (ADF) disposed on the upper cover board for conveying the document to the image-capturing area.

11. The image-capturing device according to claim 1, comprising:

a hinge for connecting the body and the upper cover, wherein the upper cover is rotatably connected to the body, the first inclined plane is located on a side of the body parallel to a direction in which the optical module moves, and the hinge is located on an opposite side.

* * * * *